June 4, 1935.  J. W. GREIG  2,003,932
RADIO DIRECTION FINDER
Filed Dec. 27, 1932   2 Sheets-Sheet 1
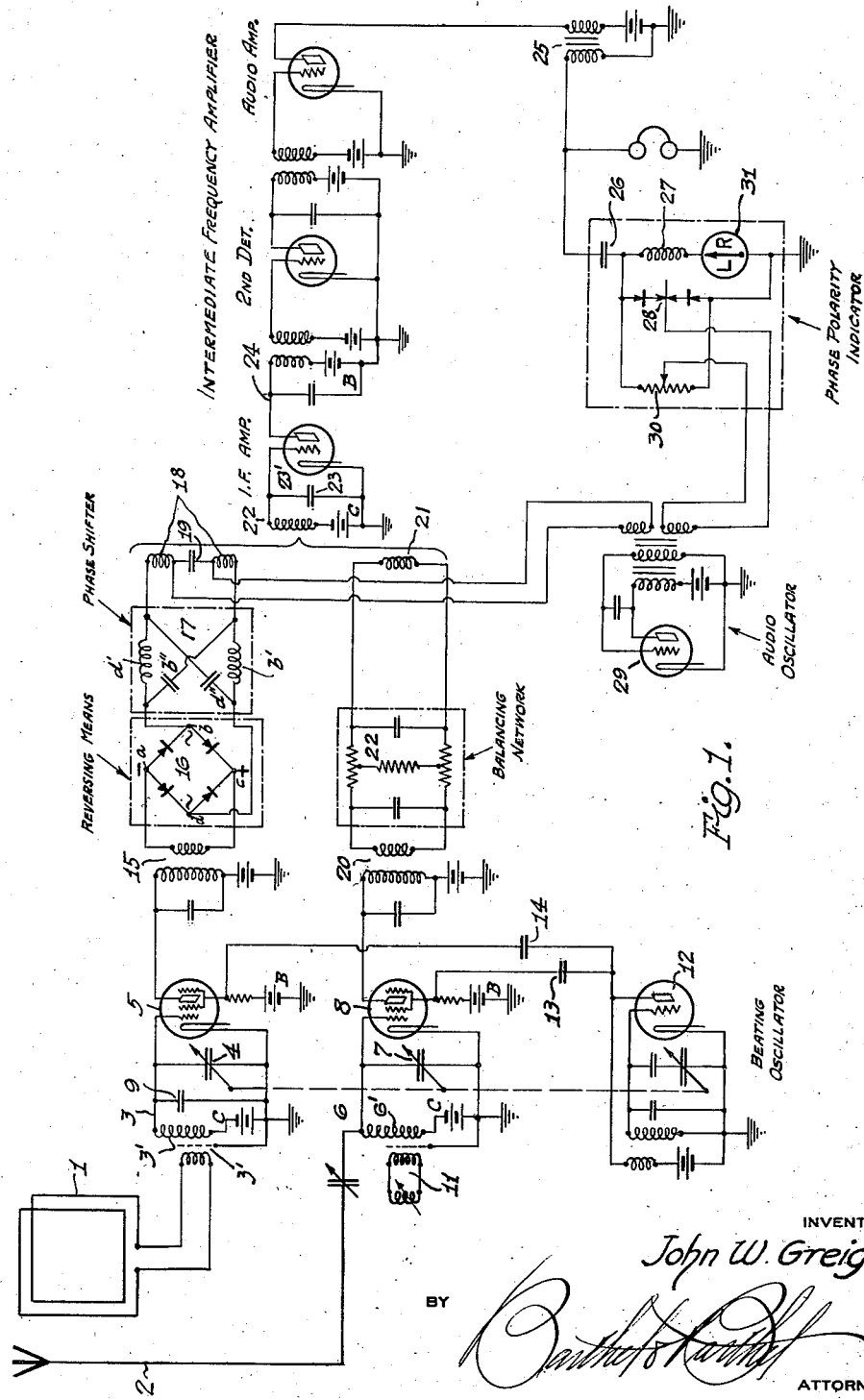
Fig. 1.
INVENTOR
John W. Greig,
BY 
ATTORNEYS June 4, 1935. J. W. GREIG 2,003,932
RADIO DIRECTION FINDER
Filed Dec. 27, 1932 2 Sheets-Sheet 2
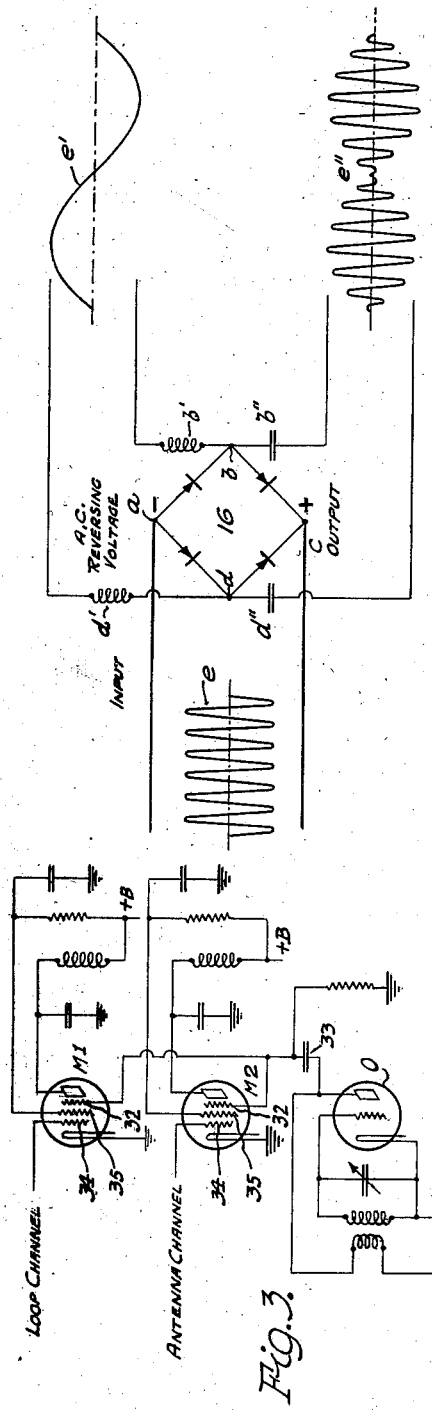
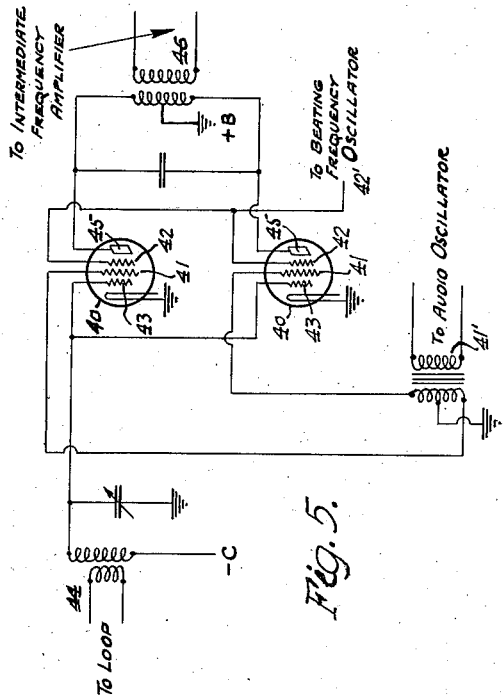
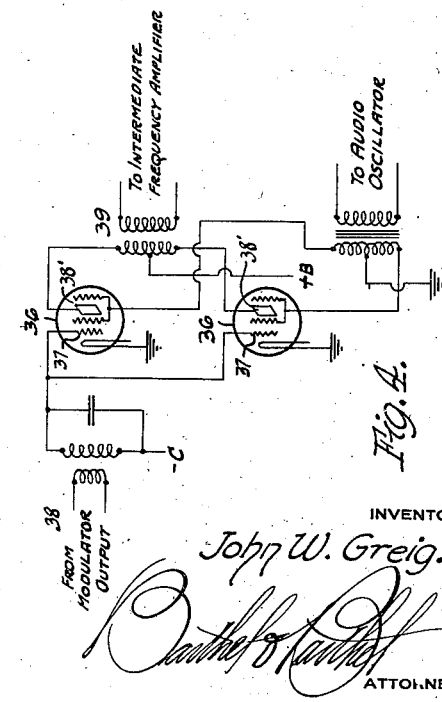
INVENTOR
John W. Greig.
BY
ATTORNEYS Patented June 4, 1935

2,003,932

UNITED STATES PATENT OFFICE 2,003,932

RADIO DIRECTION FINDER

John W. Greig, Detroit, Mich.

Application December 27, 1932, Serial No. 648,912

5 Claims. (Cl. 250—11)

My invention pertains to improvements in radio direction finding apparatus for determining the direction of arrival of radio waves in a horizontal plane, and is especially adaptable for use as a guide to the pilot of aircraft whereby such aircraft may readily be directed in the direction of a landing field during periods of low visibility such as fogs, rains and storms, etc.

It is well known in the art of radio direction finding that a vertical loop may be employed to determine the vertical plane of arrival of radio waves, since when the plane of the loop is at right angles to the plane of arrival, the magnetic field of the radio waves cuts both sides of the loop at the same instant and the E. M. F. induced in one side is in exact phase opposition to the E. M. F. induced in the other side so that the resultant output E. M. F. is zero. However, when the plane of the loop is not at right angles to the plane of arrival, the E. M. F. induced in the nearer conductor of the loop will be advanced in phase over the E. M. F. induced in the farther conductor of the loop, with the result that the difference between the two E. M. F.'s will not be zero, but will be an E. M. F. which is substantially in phase quadrature to the E. M. F. induced in the conductors of the loop. The magnitude of this output E. M. F. will be proportional to the sine of the angle of deviation from the perpendicular position, and its phase polarity a function of whether the right or left edge of the loop is nearer to the direction of arrival of the radio waves.

It is also well known in the art that the direction of arrival of the radio waves may be determined by a measurement of the magnitude and phase polarity of the output of the loop, and means have been described by previous inventors for the use of this principle. For example, if a vertical antenna is placed close to the loop, an E. M. F. will be induced in this antenna which is not a function of the direction of arrival of the radio waves, and which may be used as a standard of comparison for the determination of the relative magnitude and phase polarity of the output E. M. F. of the loop. The simplest form of measurement may be made by providing a reversing switch whereby the output of the loop may be added to the output of the vertical antenna with either normal or reverse poling, and comparing the magnitudes of the outputs from a radio receiver supplied by the loop and vertical antenna in combination for the condition of normal and reverse poling of the switch. If the output of the receiver is the same for both normal and reverse poling, the direction of arrival of the radio waves is at right angles to the loop, since the loop has then no output E. M. F. and has no effect when combined with the output from the vertical antenna. However, when the direction of arrival is to the right of the perpendicular position, the output of the loop will add to the output of the vertical antenna with the reversing switch in the normal position and will subtract when the reversing switch is in the reverse position, (assuming such poling and suitable phase shift means to give this effect). Conversely, when the direction of arrival is to the left of the perpendicular position, the output of the loop will subtract from the output of the vertical antenna when the reversing switch is in the normal position, and will add when the reversing switch is in the reverse position. Therefore the relative right or left direction of arrival may be determined by an observation of the position of the reversing switch which gives the greatest output from the receiver, and the approximate magnitude of the deviation from the perpendicular to the plane of the loop determined by the difference in the output of the receiver with the reversing switch in the normal position and the output with the reversing switch in the reverse position.

An important factor in the use of the above system is the provision of means to shift the phase of the output of the loop to approximately coincide with the phase of the output of the vertical antenna, since if the vertical antenna is located at the center of the loop and both loop and vertical antennas are tuned to resonance, the output current of the lop will be in phase quadrature to the output current of the vertical antenna, and the sum of the two currents will be the same for both the normal and reverse polings of the reversing switch. Some phase shifting device must therefore be placed in either the output of the loop or antenna or both, which produces a relative phase shift of approximately 90 degrees before the combination of the output current of the loop with the output current of the vertical antenna on the receiver input.

Various methods have been heretofore proposed for an automatic operation of the reversing switch and automatically indicating the position of the switch which gives the maximum output from the receiver, in order to make the system suitable for use on aircraft or other mobile vehicles. In the most practical forms, the reversing switch or some equivalent device has been operated at a high speed of alternation so that the alternate addition and substraction of the loop and antenna outputs have produced a modulation of the carrier applied to the radio receiver at an audio frequency. The phase of the audio frequency derived from the output of the receiver is then compared with the phase of the audio current employed to actuate the reversing means, and the relative plus or minus phase polarity indicated by a zero center meter, and this polarity employed as an indication of the relative direction of deviation of the direction of arrival from the perpendicular to the loop.

In the systems of the prior art the phase shift necessary to make the output of the loop additive or subtractive to the output from the vertical antenna is secured by means which reduces the efficiency of the system, such as mistuning the antenna or loop circuits or introducing a reactance-resistance phase shifter. It is also difficult in such systems to secure a phase shift which remains constant at 90 degrees over a band of frequencies.

It is an object of my invention to provide a means whereby the phase shift may be accurately adjusted to 90 degrees.

It is a further object of my invention to provide a means whereby the phase shift may be maintained constant over a range of frequencies.

Another object is to provide a reversing means, said switch comprising an arrangement of rectifiers of the copper oxide, vacuum or gas tube types.

A still further object of my invention is to provide a means whereby the percentage modulation produced by the reversing device is constant over a range of frequencies, and which in combination with an automatic gain control will make the deflection of the indicating meter a constant function of the deviation of the direction of the incoming signal from the perpendicular to the loop.

The novel feature of my invention whereby the above objects are attained is the use of a superheterodyne type of radio receiver with two input channels, two or more modulators, means in the intermediate frequency circuit for periodically reversing the loop channel with respect to the vertical antenna channel, and means in the intermediate frequency circuit for shifting the phase of the current from the loop channel to coincide with the phase of the current from the antenna channel. This feature, as well as other novel features which I believe to be characteristic of my invention are set forth in the appended claims. The invention itself, however, both as to its organization and method of operation together with further objects and advantages thereof, will best be understood by reference to the following description when read in connection with the accompanying drawings wherein—

Figure 1 is a schematic diagram of the circuit arrangement of one embodiment of my direction finder;

Fig. 2 shows how a copper oxide full wave rectifier may be employed as a reversing means;

Fig. 3 is a schematic diagram of a form of modulator circuit which minimizes crosstalk between the loop and antenna channels;

Fig. 4 is a schematic diagram of alternative methods of employing vacuum tubes for a reversing means;

Fig. 5 is a schematic diagram of a novel method of employing push-pull modulators as a reversing means.

The filament heating circuits have been omitted from these circuits as means for engaging the filaments are well known to those versed in the art.

Making reference to the accompanying drawings and first directing special attention to Figure 1 showing the preferred form of circuit, I will describe the various features of my invention.

Loop antenna 1 is shown as inductively coupled to the tuned input circuit 3 consisting of inductance 3' and condenser 4, which is associated with the input to the first detector or modulator tube 5. An electrostatic shield 3" is shown between the loop winding and the inductance 3' in order to prevent electrostatic transfer of energy from the loop which would cause an error in the directional indication. The loop may be a single turn transverse to the longitudinal axis of the ship, or it may be a smaller multiturn loop capable of rotation about a vertical axis.

Vertical antenna 2 is shown as capacitively coupled to the tuned input circuit 6 consisting of inductance 6' and condenser 7, which is associated with the first detector or modulator tube 8.

The two condensers 4 and 7 are considered as of the variable type ganged together in a well known manner so that the capacities are very nearly equal at all dial settings. In order to make the phase shift introduced in the loop channel by tuned circuit 3 equal at all dial settings to the phase shift introduced in the vertical antenna channel by tuned circuit 6, a compensating condenser 9 is connected in the loop channel to balance the capacity introduced by the antenna in tuned circuit 6, and a compensating inductance 11 is introduced in the antenna channel to compensate for the effect of the loop on the tuning of circuit 3.

The advantage of maintaining a high degree of accuracy in the phase shift characteristics of these circuits will be explained later in the explanation of the action of the reversing mechanism.

While the loop antenna is shown as separate from the vertical antenna in Figure 1, it is not intended to limit my invention to use with any particular form of antennas. For example, the vertical antenna might be replaced by a midtap connection to the loop. Another variation would be the use of two vertical stub masts with the outputs connected in series opposition to replace the loop.

The use of the two modulators 5 and 8 constitutes the most unique feature of this invention. By thus converting the output from the loop and the output from the vertical antenna to a fixed and comparatively low intermediate frequency prior to combination in a common amplifier, it becomes possible to perform the reversal operation with high efficiency by means of a copper oxide rectifier or other equivalent device. The use of a fixed frequency insures that the degree of modulation produced by the reversal operation is a constant percentage of the carrier current. Furthermore, the use of a fixed frequency permits the maintenance of a constant phase shift by means of a phase shifting network hereinafter referred to.

The two modulators are shown as vacuum tubes of the tetrode type with the beating radio frequency supplied to the screen grids thru separate isolating impedances 13 and 14 from a common oscillator 12. It is essential that the coupling between the loop channel and the antenna channel be substantially zero and this is obtained in Figure 1 by supplying the modulators from a common low impedance point on the beating oscillator circuit thru separate high impedance paths.

The ouput of modulator 5 is connected to the reversing rectifier 16 thru a tuned impedance matching transformer 15. The reversing means shown herein may be a bridge connected copper oxide rectifier of the type commonly employed as an instrument rectifier for alternating current measurements. The action of this full wave rectifier as a reversing means may be best explained by reference to Figure 2.

The intermediate frequency input is connected to the d. c. terminals of the rectifier, shown in Figure 2 as terminals $a$ and $c$. This input is represented graphically as an unmodulated carrier $e$ of relatively high frequency. The reversing voltage is applied to the a. c. terminals of the rectifier $d$ and $b$ thru intermediate frequency choke coils $d'$ and $b'$ and is represented graphically as a sine wave current $e'$ of relatively low frequency. The intermediate frequency output is obtained from terminals $d$ and $b$ thru condensers $d''$ and $b''$ and is represented graphically as a carrier modulated to give an envelope $e''$ of double the frequency of the reversing voltage.

At that part of the low frequency cycle when the reversing voltage is zero, the rectifier is virtually a balanced bridge so that no energy is transferred from terminals $a$—$c$ to terminals $d$—$b$. When the low frequency voltage becomes positive on the $b$ terminal, the bridge arms $bc$ and $ad$ become conductors so that the input leads are connected to the output leads with reverse poling. Conversely, when the low frequency voltage becomes positive on the $d$ terminal, the bridge arms $dc$ and $ab$ become conductors so that the input leads are connected to the output leads with normal poling.

Under these conditions, as is well known to those skilled in the art, the actual output of the rectifier will consist of sideband frequencies only, with the carrier suppressed. If the variation of impedance of the rectifier be substantially linear with respect to the low frequency voltage applied, the sideband frequencies will be the carrier frequency plus and minus the low frequency employed for reversing the rectifier. The low frequency input is made high compared to the intermediate frequency input so that the rectifier is virtually a linear conductor for the intermediate frequency and therefore but little distortion is produced in the intermediate frequency.

Referring again to Figure 1, the intermediate frequency sideband output from rectifier 16 is passed thru phase shifter 17. The type of phase shifter shown as the preferred form is a well known lattice network which has the property of shifting phase without introducing attenuation. The values of the inductances and capacities which make up this network are to be adjusted to a value which produces a phase shift of approximately 90 degrees at the frequency of the intermediate carrier. They should also be chosen of such value that the phase shift is gradual thru the 90 degree point, so that slight inaccuracies in tuning of the oscillator will not produce an excessive error in phase shift.

While the phase shifter shown in Figure 1 is of the preferred form, other forms might be employed without exceeding the scope of my invention.

The output of the phase shifter is connected to the inductance 18, which is shown as composed of two balanced sections connected in series aiding thru the bypass condenser 19. It is recognized that other methods of supplying the low frequency voltage to the rectifier might be employed, such as the arrangement shown in Figure 2.

Referring now to the output of the antenna channel, the output of modulator tube 8 is connected to the tuned output transformer 20, which in turn is connected to the inductance 21, thru a balancing network 22. The purpose of this balancing network is to introduce a phase change and attenuation in the antenna output channel which is equivalent to the phase change and attenuation produced in the loop channel by the reversing means 16. While this network 22 is not essential to the theoretical operation of my invention where an absolutely fixed intermediate frequency is assumed, it is desirable in a practical embodiment of the invention where slight variations of the intermediate frequency may be expected due to mistuning and variations of the oscillator frequency.

A resistance capacity network is shown in Figure 1 as the balancing network 22, in order to be equivalent to the impedance presented by the copper oxide rectifier employed as the reversing means 16. If other reversing means were employed, a corresponding change would be made in the balancing network.

Both inductance coils 21 and 18 are coupled to inductance coil 22, which in connection with condenser 23 forms the tuned input circuit 23' to the common intermediate frequency amplifier indicated as a whole as at 24. Since coil 21 carries the intermediate frequency carrier current while coil 18 carries the sidebands produced from the intermediate carrier by the action of the reversing means 16, the addition of the two in the common tuned circuit 23' produces a modulated carrier of intermediate frequency which is applied to the common intermediate amplifier 24.

As is well known in the radio art, the phase of the audio envelope produced by the combination of a carrier and two sidebands may be reversed 180 degrees by the reversal of the phase of the carrier or by the reversal of the phase of the sidebands, provided that the sidebands are not effectively in phase quadrature with the carrier. While the sidebands are of different frequency from each other and from the carrier, they may be considered as having a definite phase relation over a period of time which is small in comparison with the length of the modulation cycle.

For example, if the two sidebands both pass thru a maximum on that part of the modulation cycle that the carrier is passing thru zero, the sidebands may be said to be effectively in phase quadrature with the carrier and the resultant envelope will be of double the modulation frequency. However, if the sidebands pass thru a simultaneous maximum when the carrier is passing thru a maximum with the same polarity, the sidebands are effectively in phase with the carrier and the resultant envelope will be of the fundamental modulation frequency. With such a phase relation, the effect of reversing either carrier or sideband phase will be to defer the time when the three components reach a simultaneous maximum for one half of the modulation cycle, and the phase of the envelope representing the modulation frequency will be reversed.

Since the phase of the sidebands is reversed when the intermediate frequency in the loop channel is reversed in phase, and since the phase of the intermediate frequency in the loop channel is directly dependent upon the phase of radio frequency output from the loop, and since a reversal in phase of the output of the loop is produced by the direction of the arrival of the radio waves being shifted from the right to the left of the perpendicular to the plane of the loop, it may be seen that the phase polarity of the audio envelope of the intermediate frequency applied to intermediate frequency amplifier 24 will be an indication of the direction of the incoming radio waves.

Furthermore, since the directional indication is based upon a measurement of the magnitude as well as the phase of the fundamental component of the modulation produced by the reversing device, and since the relative magnitude of the fundamental component of the modulation is dependent upon the effective phase relation between carrier and sidebands, accuracy of indication is dependent upon the maintenance of a constant phase relation from the antennas thru to the point of combination at the common intermediate frequency amplifier. It is in the provision of means for securing such an accurate phase relation that the invention described herein has advantages over previous systems of a similar nature.

The circuit from the first intermediate frequency amplifier 24 to the audio output from transformer 25 is typical of any of the radio receiver circuits, commonly employed for radio telephone reception and has no features which are unique to this invention. An automatic gain control is a desirable but not a necessary feature.

The audio output of the receiver is shown as connected to an audio frequency tuned circuit consisting of a condenser 26 and an inductance 27. A balanced rectifier 28 is connected in shunt to the inductance 27. This rectifier may be of the copper oxide full wave type similar to that employed for the reversing means 16, reconnected as shown in Figure 1. The balanced rectifier is continuously supplied with audio frequency current from the audio oscillator 29 thru a balanced resistance 30, preferably at a high enough energy level to operate the rectifier elements on the linear part of the characteristic. The slider on the resistance 30 is to be adjusted to give a zero center indication on the meter 31 when no audio output is impressed from the receiver.

Since the audio output from the receiver produced by the modulating action of the reversing means 16 is synchronous with the audio output from the receiver, it will add to the audio current derived directly from the audio oscillator on one half of the rectifier 28, and subtract on the other side, thereby producing a deflection of the meter 31 whose magnitude is proportional to the magnitude of the audio output of the receiver and whose sign is a function of the relative phase polarity between the audio output from the receiver and the current derived directly from the audio oscillator. Since the phase of the audio output from the receiver is a function of the phase of the modulation envelope of the intermediate frequency applied to the intermediate amplifier 24, which has been shown to be function of the deviation of the direction of the arrival of the radio waves from the perpendicular to the plane of the loop, the meter 31 may be calibrated left and right, and may be further calibrated in degrees left and right if the carrier input to the second detector is kept at some predetermined value.

The use of a balanced rectifier to indicate phase polarity in the manner described above is well known to those versed in the art. The tuned audio frequency circuit 26—27 is, however, unique to this invention, as it is intended that this circuit be detuned from resonance to the frequency generated by the audio oscillator by an amount sufficient to bring the audio output from the receiver in approximate phase synchronism with the current derived directly from the audio oscillator 29. This adjustment is made necessary by the shift in phase introduced by the frequency selective circuits in the intermediate frequency amplifier.

While Figure 1 shows the modulator tubes to be of the tetrode or screen grid type, it is not intended to limit this invention to any particular form of modulator. For example, a pentode type of vacuum tube may be employed, as is shown in Figure 3. In this circuit the beating oscillator O supplies a beating frequency to the suppressor grids 32 of modulators M1 and M2. The suppressor grids are coupled to a low impedance point on the oscillator thru a blocking condenser 33 of low impedance to the beating frequency and to the intermediate frequency. This circuit has the advantage that there is very little reaction between the two channels, since the suppressor grids are shielded from the control grids 34 by the screen grids 35 and since the suppressor grids are so biased as to draw little or no current.

While this invention has been described in the preferred form as using a full wave copper oxide rectifier as the reversing means, it is not intended to limit the scope of the invention to any specific means of reversing the loop output, provided that such reversal be performed at a fixed intermediate frequency and not at the radio frequency received by the loop. For example, a full wave vacuum tube circuit might be employed as the reversing means, or a rotating coil, or a rotating condenser, or a polechanger of the vibrating or commutator type.

In particular, a pair of amplifying vacuum tubes might be employed in the connection shown in Figure 4 as reversing means. This connection shows two vacuum tubes 36 of the tetrode type with the grids 37 connected in parallel to the modulator output 38 and the plates 38' connected in push-pull to the intermediate frequency amplifier 39. The screen grids are supplied with low frequency alternating current from an audio oscillator, so connected in phase opposition that the tubes operate alternately, thereby reversing the phase of the output at the frequency of the audio supply. Alternative means might be used, such as connecting the grids in push pull and the plates in parallel.

Another variation from the preferred form which still comes within the scope of my invention is shown in Figure 5. In this case a pair of vacuum tubes 40 is employed for both reversing means and modulator. A pentode type of tube is preferred for this connection with the screens 41 supplied by audio frequency 41' in phase opposition so that the tubes are energized alternately. The suppressor grids 42 are shown as supplied with a heterodyne frequency from the beating frequency oscillator. The control grids 43 are connected in parallel to the radio frequency input circuit 44 and the plates 45 are connected in push pull to the intermediate frequency output 46. Still other forms of this same circuit might be employed, such as connecting the grids in push-pull and the plates in parallel; or connecting the grids in parallel, the plates in parallel, and the suppressor grids in push-pull. The same principle might be employed with either tetrode or triode tubes by a combination of the various control and modulating voltages on the same electrodes.

A still further variation which might be employed would be the use of an audio frequency feed back circuit in combination with the connections of Figures 4 or 5 so that the pair of tubes which act as the reversing means would also act as an audio oscillator.

In the application of my invention to aircraft it is expected that the meter shown as 31 in Figure 1 would be mounted on the instrument board in connection with the other navigating instruments. It is preferred that the connections to the meter be so poled that the needle deflect to the right when the nose of the ship turns to the right of the direction of the incoming radio waves, since this is an established convention used for the well known turn indicator. Then when the ship is flying toward the station, a semi-automatic response of the pilot in keeping the needle centered will bring the ship over the radio transmitter to which the receiver is tuned. After the ship has passed over the station, the same response on the part of the pilot will tend to increase the deflection of the needle, thereby informing the pilot that he has passed over the station.

In the case of a strong cross wind, the plane would tend to describe a curved course in flying to the transmitting station. This error might be compensated for by flying the plane with the needle a certain amount off center, thus "crabbing" the plane enough to allow for the cross wind. An occasional reference to the compass course would show when the proper drift had been allowed for.

As for example the use of a multi-element tube as a modulator which incorporates a double diode rectifying element to replace the external rectifier as a reversing means.

Although specific embodiments of the invention have been illustrated and described, it will be understood that various alterations in the details of construction may be made without departing from the scope of the invention, as indicated by the appended claims.

I claim:—

1. In a radio direction finding receiver having two separate input channels with a reversing means in one channel, the provision of an electrical network in the other channel having substantially the same input impedance and transfer impedance as the said reversing means.

2. A radio receiving apparatus for indicating the vertical plane in which radio frequency signals arrive with respect to an antenna system; consisting of a loop, a vertical antenna, a loop tuning means, a vertical antenna tuning means, a first modulator having an input circuit connected to said loop tuning means, a second modulator having an input circuit connected to said antenna tuning means, a radio frequency oscillator electrically coupled to both of said modulators to deliver a frequency which beats with the incoming signal frequency to form an intermediate frequency, two separate intermediate frequency channels connected to the output circuits of the said two modulators, a reversing means in one of said channels, a phase shifting means in the other of said channels, an audio frequency oscillator connected to operate said reversing means, an intermediate frequency amplifier having an input circuit connected to the outputs of both of said intermediate frequency channels, a detector, and means connected to said detector and to said audio oscillator for indicating the relative phase polarity of the audio output of the detector as compared with the phase of said audio oscillator.

3. A radio receiving apparatus for indicating the direction of arrival of radio signals, comprising a loop, an antenna, a loop tuning circuit, an antenna tuning circuit, a first modulator supplied with radio frequency energy from the loop tuning circuit, a second modulator supplied with radio frequency energy from the antenna tuning circuit, a radio frequency oscillator supplying a radio frequency to both of said modulators which differs from the radio frequency in the loop and antenna circuits by an intermediate frequency, an audio frequency oscillator, means for reversing the phase of the intermediate frequency output of one of said modulators at the frequency of the said audio oscillator, means for shifting the phase of the output of one of said modulators with respect to the phase of the output of the other of said modulators, means for combining the sidebands of the intermediate frequency produced by the reversing means with the intermediate frequency carrier, means for amplifying the said combined intermediate frequency carrier and sidebands, a detector, and phase polarity indicating means connected to both said detector and the said audio oscillator.

4. In combination, a radio direction finding receiver, selectively tuned intermediate frequency circuits in said receiver for producing a phase shift in the output of said receiver, a network receiving the output of said receiver, said network consisting of an inductance, a capacity in series with said inductance, an indicating meter in series with said inductance, a balanced rectifier shunted around said inductance and said meter, an audio oscillator coupled to said rectifier to continuously supply current thereto, said capacity and said inductance being adjusted to produce a phase shift in the audio frequency appearing in said receiver output, which is equal and opposite to the phase shift produced by said selectively tuned phase shifters.

5. In a radio receiving apparatus for indicating the vertical plane in which radio signals arrive, comprising a loop, a vertical antenna, a loop tuning means, a vertical antenna tuning means, first and second modulator tubes, said tubes being multigrid type vacuum tubes including input grids and screen grids, said input grids of said first and second modulator tubes being connected to said loop and said antenna tuning means respectively, a radio frequency oscillator connected to the screen grids of said modulator tubes, said oscillator being adapted to produce a frequency which beats with the signal frequency from said loop and antenna tuning means respectively to form an intermediate frequency, two separate intermediate frequency channels connected to the outputs of said modulator tubes, a reversing means in one channel, and an electrical network in the other channel having substantially the same input impedance and transfer impedance as the said reversing means.

JOHN W. GREIG.